US012730951B2

(12) United States Patent
Chen et al.

(10) Patent No.: US 12,730,951 B2
(45) Date of Patent: Sep. 8, 2026

(54) CIRCUIT SIMULATION METHOD AND DEVICE

(71) Applicant: CHANGXIN MEMORY TECHNOLOGIES, INC., Hefei City (CN)

(72) Inventors: Yue Chen, Hefei City (CN); Zengquan Wu, Hefei City (CN)

(73) Assignee: CHANGXIN MEMORY TECHNOLOGIES, INC., Hefei City (CN)

( * ) Notice: Subject to any disclaimer, the term of this patent is extended or adjusted under 35 U.S.C. 154(b) by 973 days.

(21) Appl. No.: 17/934,534

(22) Filed: Sep. 22, 2022

(65) Prior Publication Data

US 2023/0018228 A1 Jan. 19, 2023

(30) Foreign Application Priority Data

Jun. 1, 2022 (CN) ........................ 202210618408.X

(51) Int. Cl.
*G06F 30/3308* (2020.01)
*G06F 119/06* (2020.01)

(52) U.S. Cl.
CPC ...... *G06F 30/3308* (2020.01); *G06F 2119/06* (2020.01)

(58) Field of Classification Search
CPC ..... Y02E 60/00; G06F 30/31; G06F 30/3308; G06F 2119/06; G06F 30/33
See application file for complete search history.

(56) References Cited

U.S. PATENT DOCUMENTS

2021/0182467 A1* 6/2021 Chang .................. G06F 30/398
2022/0245316 A1* 8/2022 Chen .................... G06F 30/398

FOREIGN PATENT DOCUMENTS

CN 112949233 A 6/2021

OTHER PUBLICATIONS

"SPICE 'Quick' Reference Sheet", Stanford EE133-Winter 2001, retrieved from https://web.stanford.edu/class/ee133/handouts/general/spice_ref.pdf (Year: 2001).*

(Continued)

*Primary Examiner* — Rehana Perveen
*Assistant Examiner* — Troy A Maust
(74) *Attorney, Agent, or Firm* — Syncoda LLC; Feng Ma

(57) ABSTRACT

A circuit simulation method includes the following: a key character string corresponding to at least one target power supply node is determined; a node identifier corresponding to the at least one target power supply node is searched out from a first netlist corresponding to the to-be-simulated circuit according to the key character string; and a power supply voltage file corresponding to the at least one target power supply node is generated according to the searched-out node identifier, and the to-be-simulated circuit is simulated according to the power supply voltage file. The circuit simulation method and the device provided by the embodiments of the present disclosure may rapidly generate the power supply voltage file corresponding to the target power supply node, which can not only effectively improve the circuit simulation efficiency, but also ensure the accuracy of a simulation result.

15 Claims, 5 Drawing Sheets

A key character string corresponding to at least one target power supply node is determined — S101

↓

A node identifier corresponding to the at least one target power supply node is searched out from a first netlist corresponding to a to-be-simulated circuit according to the key character string — S102

↓

A power supply voltage file corresponding to the at least one target power supply node is generated according to the searched-out node identifier, and the to-be-simulated circuit is simulated according to the power supply voltage file — S103

(56) References Cited

OTHER PUBLICATIONS

"Find and Replace Text", Altium CircuitStudio Technical Documentation updated Aug. 16, 2018, retrieved from https://www.altium.com/documentation/cstu/find-and-replace-text (Year: 2018).*

Naveen et al. "N2S: An Automatic Netlist to Schematic generator" 1991 IEEE (Year: 1991).*

"Find-Replace Text", NEXUS Client 5, 4, 3.2, 3.1, 3.0, 2.1, 2.0, 1.1 and 1.0 Technical Documentation, updated Jul. 16, 2018, retrieved on Jan. 17, 2026 from https://www.altium.com/documentation/altium-nexus/textedit-dlg-findrepldlgformfind-replace-text-ad (Year: 2018).*

CN first office action in application No. 202210618408.X, mailed on Jun. 18, 2026.

Sep. 29, 2020, "IC Packagers: The Importance of Proper DC Net Identification", Tyler, https://community.cadence.com/cadence_blogs_8/b/pcb/posts/importance-of-proper-dc-net-identification.

Oct. 14, 2010, "How to Multi-Voltage IC Design in 10 Easy Steps", glforte, https://semiwiki.com/eda/229-how-to-multi-voltage-ic-design-in-10-easy-steps/.

* cited by examiner

CIRCUIT SIMULATION METHOD AND DEVICE

CROSS-REFERENCE TO RELATED APPLICATION

This application claims priority to Chinese Patent Application No. 202210618408.X filed on Jun. 1, 2022, the disclosure of which is hereby incorporated herein by reference in its entirety.

BACKGROUND

In the early stage of chip design, there are some special power supply nodes in a chip. During simulation, specific voltages need to be supplied to these power supply nodes based on a power supply voltage file.

However, due to the uncertainty of the above power supply nodes, a unified power supply voltage file may not be used for each simulation. In the conventional technology, before each simulation, the above power supply nodes existing in a circuit are manually checked and the corresponding power supply voltage file is edited accordingly. In a case of a large number of the above power supply nodes, time and labor are wasted, and omissions or errors may easily occur.

SUMMARY

Embodiments of the present disclosure relate to the technical field of semiconductors, in particular to a circuit simulation method and device Embodiments of the present disclosure provide a circuit simulation method and device, which may effectively improve the efficiency and accuracy of circuit simulation.

In a first aspect, the embodiments of the present disclosure provide a circuit simulation method, which is applied to a to-be-simulated circuit. The to-be-simulated circuit may include multiple power supply nodes. The method may include the following operations. A key character string corresponding to at least one target power supply node is determined. A node identifier corresponding to the at least one target power supply node is searched out from a first netlist corresponding to the to-be-simulated circuit according to the key character string. The node identifier consists of the key character string and at least one other character. A power supply voltage file corresponding to the at least one target power supply node is generated according to the searched-out node identifier, and the to-be-simulated circuit is simulated according to the power supply voltage file.

In a second aspect, the embodiments of the present disclosure provide a circuit simulation apparatus, which is applied to a to-be-simulated circuit. The to-be-simulated circuit may include a memory storing processor-executable instructions; and a processor. The processor is configured to execute the stored processor-executable instructions to perform operations of: determining a key character string corresponding to at least one target power supply node; searching out a node identifier corresponding to the at least one target power supply node from a first netlist corresponding to the to-be-simulated circuit according to the key character string, the node identifier consisting of the key character string and at least one other character; and generating a power supply voltage file corresponding to the at least one target power supply node according to the searched-out node identifier, and simulate the to-be-simulated circuit according to the power supply voltage file.

In a third aspect, the embodiments of the present disclosure provide a non-transitory computer-readable storage medium storing computer-executable instructions. The computer-executable instructions are executed by a processor to implement operations of: determining a key character string corresponding to at least one target power supply node; searching out a node identifier corresponding to the at least one target power supply node from a first netlist corresponding to the to-be-simulated circuit according to the key character string, the node identifier consisting of the key character string and at least one other character; and generating a power supply voltage file corresponding to the at least one target power supply node according to the searched-out node identifier, and simulate the to-be-simulated circuit according to the power supply voltage file.

DETAILED DESCRIPTION

Figure 1:
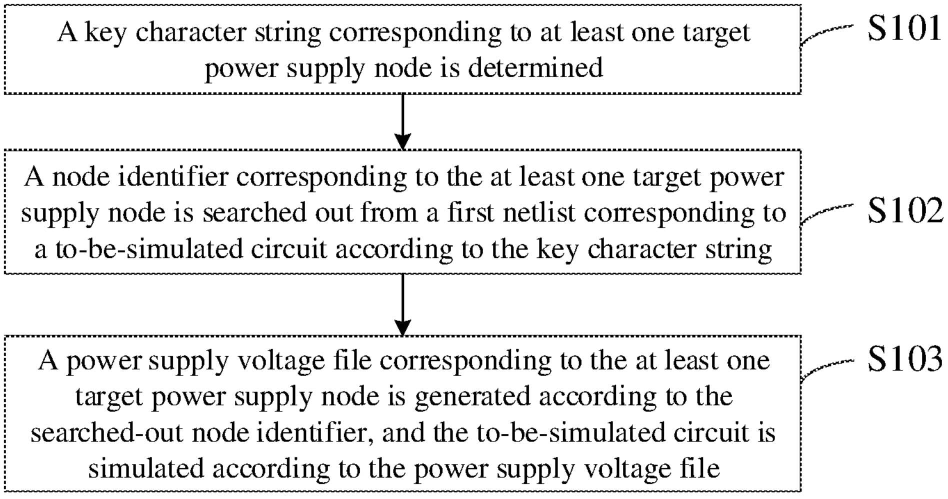
FIG. 1 is a first schematic flowchart showing operations of a circuit simulation method according to an embodiment of the present disclosure.

In order to make objectives, technical solutions, and advantages of embodiments of the present disclosure clearer, the technical solutions in the embodiments of the present disclosure will be clearly and completely described below in combination with the drawings in the embodiments of the present disclosure. It is apparent that the described embodiments are only part of the embodiments of the present disclosure, not all the embodiments. Based on the embodiments in the present disclosure, all other embodiments obtained by those ordinary skilled in the art without creative work shall fall within the protection scope of the present disclosure. In addition, although the content in the present disclosure is introduced according to one or several demonstrative examples, it is to be understood that each aspect of the present disclosure may also individually constitute a complete implementation.

It is to be noted that, the brief description of the terms in the present disclosure is only for the convenience of understanding the implementations described next, and is not intended to limit the implementations of the present disclosure. Unless otherwise stated, these terms should be understood according to their ordinary and usual meanings.

The terms “first”, “second”, and the like in the specification and claims of the present disclosure and in the above drawings are used to distinguish similar or like objects or entities and unnecessarily for limiting a specific sequence or sequential order, unless otherwise noted. It is to be understood that such terms may be interchangeable where appropriate, and may be, for example, implemented in a sequence in addition to those illustrated or described in the embodiments of the present disclosure.

Furthermore, the terms "include" and "having", as well as any variations thereof, are intended to cover a non-exclusive inclusion, for example, a product, or a device that includes a series of components is not necessarily limited to those expressly listed components, but may include other components not expressly listed or inherent to such product, or device.

The term "module" as used in the present disclosure refers to any known or later developed hardware, software, firmware, artificial intelligence, fuzzy logic or combination of hardware or/and software code and may perform a function associated with the element.

The embodiments of the present disclosure may be applied to the field of semiconductors, for example, integrated circuit testing links.

In the early stage of chip design, there are some special power supply nodes in a chip. During simulation, specific voltages need to be provided for these power supply nodes based on a power supply voltage file.

Exemplarily, taking a Dynamic Random Access Memory (DRAM) as an example, in the early stage of DRAM design, there are power supply nodes without a power switch (Pswitch) in a full chip mode, so that during finsim simulation, specific voltages need to be supplied to the power supply nodes.

Due to the uncertainty of the above power supply nodes, a unified power supply voltage file may not be used for each simulation. In the conventional technology, before each simulation, the above power supply nodes existing in a circuit are manually checked and the corresponding power supply voltage file is edited accordingly. In a case of a large number of the above power supply nodes, time and labor are wasted, and omissions or errors may easily occur.

For the above technical problems, the embodiments of the present disclosure provide a circuit simulation method and device. A key character string corresponding to a target power supply node is determined, a node identifier corresponding to the target power supply node is searched out from a first netlist corresponding to the to-be-simulated circuit, the power supply voltage file corresponding to the target power supply node is generated based on the searched-out node identifier, and the to-be-simulated circuit is simulated according to the power supply voltage file. In this way, compared with a way of manually checking the target power supply node and manually editing the power supply voltage file, the circuit simulation efficiency may be effectively improved, and the accuracy of a simulation result is ensured. For the detailed process, reference is made to the following embodiments.

The circuit simulation method provided in the embodiment of the present disclosure may be applied to the to-be-simulated circuit, and the to-be-simulated circuit may include components, wires, nodes, etc. Herein, the node represents a mutual connection relationship between several component pins or several wires.

Optionally, the above to-be-simulated circuit may include multiple power supply nodes.

Referring to FIG. 1, FIG. 1 is a first schematic flowchart showing operations of a circuit simulation method according to an embodiment of the present disclosure. In some embodiments of the present disclosure, the circuit simulation method includes the following operations.

At S101, a key character string corresponding to at least one target power supply node is determined.

In a feasible implementation, before simulating the to-be-simulated circuit, a simulation engineer first determines the target power supply node needing the specific voltage in the to-be-simulated circuit, and then determines the key character string corresponding to each target power supply node.

Optionally, in some embodiments, the above target power supply node may be a power supply node that needs to be connected to 0 potential in the to-be-simulated circuit.

In a feasible implementation, an external power supply voltage (e.g. VCC/VSS) received by the to-be-simulated circuit may be defined in a design file corresponding to the to-be-simulated circuit, and each internal target power supply node (e.g. vcsl, veq, vcc, vss, etc.) is generated through the power switch (Pswitch), so that the simulation engineer may determine each target power supply node based on the design file corresponding to the to-be-simulated circuit.

After the target power supply node in the to-be-simulated circuit is determined, the key character string corresponding to each target power supply node may be determined. Exemplarily, assuming that the determined target power supply nodes in the to-be-simulated circuit include vcsl, vcc and vss, the key character strings corresponding to the target power supply nodes vcsl, vcc and vss may be set to be vcslz, vccz and vssz respectively.

Herein, the number of the above target power supply nodes may be one or multiple, which is not limited in the embodiments of the present disclosure.

In a feasible implementation, after determining the key character string corresponding to the at least one target power supply node, the simulation engineer may input the determined key character string to a simulation platform. When detecting an input command, the simulation platform receives the key character string input through the input command.

At S102, a node identifier corresponding to the at least one target power supply node is searched out from a first netlist corresponding to the to-be-simulated circuit according to the key character string.

Herein, the node identifier consists of the key character string and at least one other character.

The above first netlist usually includes multiple power supply nodes, and different power supply nodes correspond to different node identifiers.

In a feasible implementation, after receiving the key character string corresponding to the at least one target power supply node input by the simulation engineer, the simulation platform searches out the node identifier containing the above key character string from the first netlist corresponding to the to-be-simulated circuit, and uses the searched-out node identifier as the node identifier corresponding to the at least one target power supply node.

Exemplarily, assuming that the first netlist corresponding to the to-be-simulated circuit contains the following node identifiers: "vcslzB7R!", "vcslzB7L!", "vcslzB1R!", "vcslzB1L!", "vcczCaPad!" and "vcczR0!", when the key character string of the target power supply node received by the simulation platform is "vcslz", the node identifiers searched out from the first netlist are: "vcslzB7R!", "vcslzB7L!", "vcslzB1R!" and "vcslzB1L!".

Herein, since the same target power supply node corresponds to a same key character string and may correspond to multiple corresponding node identifiers, it is possible to search out multiple node identifiers based on one key character string.

It is to be understood that, in some embodiments of the present disclosure, multiple node identifiers corresponding to the target power supply nodes containing a same key character string may be searched out in batches through a small number of key character strings, so that compared with a way of manually searching one by one from the netlist of the to-be-simulated circuit, the method according to the present disclosure can be more time-saving and labor-saving, and has higher search efficiency.

In addition, after the simulation platform receives the key character string corresponding to the target power supply node, if the node identifier corresponding to the target power supply node is not searched out from the first netlist corresponding to the to-be-simulated circuit, it may be determined that the above target power supply node does not exist in the to-be-simulated circuit. That is, in some embodiments of the present disclosure, the key character string corresponding to the target power supply node may also be used to determine whether the target power supply node exists in the to-be-simulated circuit.

It is to be understood that, all node identifiers corresponding to the target power supply nodes containing the key character string in the to-be-simulated circuit can be searched out in batches through a small number of key character strings. Therefore, compared with a way of inputting the node identifiers corresponding to the target power supply nodes one by one to determine whether the target power supply node exists in the to-be-simulated circuit, the method has higher efficiency.

At S103, a power supply voltage file corresponding to the at least one target power supply node is generated according to the searched-out node identifier, and the to-be-simulated circuit is simulated according to the power supply voltage file.

In a feasible implementation, the power supply voltage corresponding to the target power supply node may be predetermined, and after the node identifier corresponding to the target power supply node is searched out, the power supply voltage file corresponding to the target power supply node is generated based on the node identifier corresponding to the target power supply node, the power supply voltage corresponding to the target power supply node, and the format of the power supply voltage file required by the simulation platform.

After the power supply voltage file is generated, the simulation platform may perform simulation testing on the to-be-simulated circuit. Herein, during the simulation process, power is supplied to each target power supply node according to the power supply voltage corresponding to each target power supply node in the power supply voltage file.

According to the circuit simulation method provided by the embodiments of the present disclosure, the node identifier corresponding to the target power supply node is searched out from the first netlist corresponding to the to-be-simulated circuit through the key character string corresponding to the target power supply node, the power supply voltage file corresponding to the target power supply node is generated based on the searched-out node identifier, and the to-be-simulated circuit is simulated according to the power supply voltage file. In this way, compared with a way of manually checking the target power supply node and manually editing the power supply voltage file, the circuit simulation efficiency may be effectively improved, and the accuracy of the simulation result is ensured.

Based on the contents described in the above embodiments, in some embodiments of the present disclosure, when the key character string corresponding to the target power supply node is set, if the target power supply node needing the specific voltage in the to-be-simulated circuit is predetermined, the key character string corresponding to the target power supply node is set according to the determined target power supply node.

Exemplarily, assuming that the target power supply node in the to-be-simulated circuit is determined to be vcsl, the key character string corresponding to the target power supply node vcsl may be set to be vcslz.

In other embodiments of the present disclosure, when the key character string corresponding to the target power supply node is set, if it is uncertain which target power supply nodes exist in the to-be-simulated circuit, the key character string corresponding to the target power supply node may be set according to a setting rule corresponding to the node identifier of the target power supply node.

Exemplarily, assuming that the setting rule corresponding to the node identifier of the target power supply node is "v+at least one character+z+at least one character", the key character string corresponding to the target power supply node may be set to be "v[a–z]*z".

In a feasible implementation of the present disclosure, after receiving the key character string corresponding to the at least one target power supply node, the simulation platform searches out the node identifier containing the key character string from the first netlist corresponding to the to-be-simulated circuit, and uses the searched-out node identifier as the node identifier corresponding to the at least one target power supply node.

Exemplarily, assuming that the node identifiers contained in the first netlist corresponding to the to-be-simulated circuit are "vcslzB7R!", "vcslzB7L!", "vcslAB1R!", "vcslAB1L!", "vcczCaPad!" and "vcczR0!", when the received key character string is "vcslz", the searched-out node identifiers are "vcslzB7R!" and "vcslzB7L!" respectively. When the received key character string is "vccz", the searched-out node identifiers are "vcczCaPad!" and "vcczR0!" respectively. When the received key character string is "vxxz", the searched-out node identifiers are "vcslzB7R!", "vcslzB7L!", "vcczCaPad!" and "vcczR0!" respectively, then it may be determined that the target power supply node corresponding to "vcslzB7R!" and "vcslzB7L!" is vcsl, and the target power supply node corresponding to "vcczCaPad!" and "vcczR0!" is vcc.

In some embodiments of the present disclosure, after the node identifiers corresponding to the target power supply node are searched out, the power supply voltage of the target power supply node corresponding to each node identifier may be queried according to the configuration information of each power supply node in the to-be-simulated circuit, and the power supply voltage file is generated according to the power supply voltage of the target power supply node corresponding to each node identifier.

Exemplarily, assuming that after a node identifier corresponding to the target power supply node is searched out, the power supply voltage of the target power supply node corresponding to the node identifier is queried to be 0 v according to the configuration information of each power supply node in the to-be-simulated circuit, then the power supply voltage of the target power supply node is 0 v in the generated power supply voltage file.

In some embodiments of the present disclosure, after the power supply voltage of the target power supply node corresponding to each node identifier is queried, a power supply voltage data item corresponding to each node identifier is output on a line-by-line basis according to a preset output format, and finally, the output power supply voltage data items of all lines are summarized into the power supply voltage file. Herein, the power supply voltage data item corresponding to each node identifier includes the power supply voltage of the target power supply node corresponding to each node identifier.

Herein, the above output format is a file format which may be directly recognized by simulation software.

Optionally, the preset output format may be as follows.

Node identifier (with ! removed) Node identifier 0 power supply voltage power=0

Herein, the power supply voltage may be output in the format of "dc=p key character string (with z removed)".

Herein, 0 represents a ground terminal, and power represents the power supply type.

Exemplarily, assuming that the key character string received by the simulation platform is "vcslz", based on the key character string, the node identifier searched out from the first netlist of the to-be-simulated circuit is "vcslzB7R!", and after query, it is determined that the power supply voltage of the target power supply node corresponding to the node identifier is DC voltage and V=vcsl, then the power supply voltage data item corresponding to the above node identifier is output as follows.

vcslzB7R vcslzB7R! 0 dc=pvcs1 power=0

In some embodiments of the present disclosure, when multiple node identifiers are queried, the power supply voltage data items corresponding to each node identifier are output on a line-by-line basis, thereby forming the power supply voltage file.

Exemplarily, assuming that the node identifiers searched out by the simulation platform include "vcslzB7R!", "vcslzB7L!", "vcslzB1R!", "vcslzB1L!", "vcczCaPad!" and "vcczR0!", the generated power supply voltage files are as follows:

vcslzB7R vcslzB7R! 0 dc=pvcs1 power=0
vcslzB7L vcslzB7L! 0 dc=pvcs1 power=0
vcslzB1R vcslzB1R! 0 dc=pvcs1 power=0
vcslzB1L vcslzB1L! 0 dc=pvcs1 power=0
vcczCaPad vcczCaPad! 0 dc=pvcc power=0
vcczR0 vcczR0! 0 dc=pvcc power=0

According to the circuit simulation method provided by the embodiments of the present disclosure, the node identifier corresponding to the target power supply node is searched out from the first netlist of the to-be-simulated circuit through the key character string corresponding to the target power supply node, and then the power supply voltage file corresponding to the target power supply node may be automatically generated based on the searched-out node identifier. In this way, compared with a way of manually checking the target power supply node and manually editing the power supply voltage file, the circuit simulation efficiency may be effectively improved, and the accuracy of the simulation result is ensured.

Figure 2:
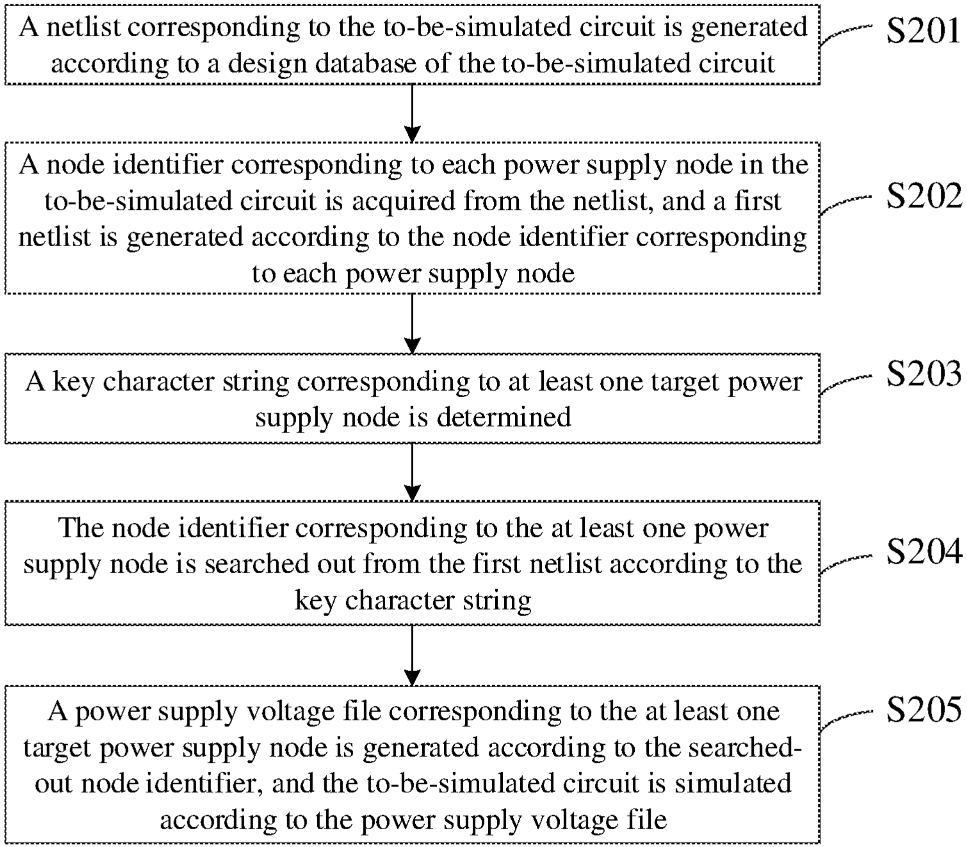
FIG. 2 is a second schematic flowchart showing operations of a circuit simulation method according to an embodiment of the present disclosure.

Based on the contents described in the embodiments, referring to FIG. 2, FIG. 2 is a second schematic flowchart showing operations of a circuit simulation method according to an embodiment of the present disclosure. In some embodiments of the present disclosure, the circuit simulation method includes the following operations.

At S201, a netlist corresponding to the to-be-simulated circuit is generated according to a design database of the to-be-simulated circuit.

In some embodiments of the present disclosure, taking the chip design process as an example, the chip design stage may specify the purpose, specifications, and performance of the chip, and the chip design may be classified into processes such as function definition, system-level design, front-end design, and back-end design.

Herein, the function definition describes the requirements for the function and performance parameters of the chip. System design refers to the system-level design of specifying chip architecture, a service module, a power supply, etc., based on the previous function definition. During front-end design, a designer carries out specific circuit design for each module according to a scheme determined by the system design, and uses a special hardware description language to perform code description on the specific circuit implementation at the Register Transfer Level (RTL) to generate a code which may be understood by a computer. After the code is generated, it is necessary to repeatedly check the correctness of the code design through simulation verification in strict accordance with the established specification standard. Then, a RTL code written in the hardware description language is converted into a gate-level netlist using a logic synthesis tool to ensure that the circuit is up to the standard in terms of target parameters such as area and timing. After the logic synthesis is completed, static timing analysis needs to be performed, and a specific timing model is applied to analyze whether a specific circuit violates the timing constraints given by the designer. The entire design process is an iterative process, and if any step fails to meet the requirements, the previous steps need to be repeated, or even the RTL code needs to redesigned. The back-end design is that layout and winding are performed on the circuit within a given size of silicon wafer area based on the netlist, and then various functional and timing verifications are performed on the physical layout of the wiring. The back-end design is also an iterative process. If the verification does not meet the requirements, the previous steps need to be repeated, and finally a Graphic Data Stream (GDS) file for chip production is generated.

In some embodiments of the present disclosure, the netlist corresponding to the to-be-simulated circuit may be generated based on the design database of the to-be-simulated circuit. The netlist includes circuit description statements of the to-be-simulated circuit, such as the connection mode of the circuit, properties, parameters, identification information, etc. of components, devices and power supply nodes constituting the circuit, etc.

At S202, a node identifier corresponding to each power supply node in the to-be-simulated circuit is acquired from the netlist, and a first netlist is generated according to the node identifier corresponding to each power supply node.

In some embodiments of the present disclosure, the node identifier corresponding to each power supply node in the to-be-simulated circuit is acquired from a netlistHeader file in the netlist generated by the to-be-simulated circuit, and the first netlist is generated according to the node identifier corresponding to each power supply node.

Herein, the above first netlist may only contain the node identifier corresponding to each power supply node in the to-be-simulated circuit, thereby greatly simplifying the amount of data in the first netlist.

At S203, a key character string corresponding to at least one target power supply node is determined.

In some embodiments of the present disclosure, the target power supply node may be a power supply node, which is connected with an external power supply through a power switch, in the to-be-simulated circuit.

Herein, the above power switch achieves the purpose of reducing static power consumption by turning off the power supply voltage of a certain area or a certain sub-module, which is not needed temporarily, in the chip.

At S204, the node identifier corresponding to the at least one power supply node is searched out from the first netlist according to the key character string.

It is to be understood that, since the above first netlist may only contain the node identifier corresponding to each power supply node in the to-be-simulated circuit, the search speed of searching the node identifier corresponding to the target power supply node in the first netlist can be improved.

At S205, a power supply voltage file corresponding to the at least one target power supply node is generated according to the searched-out node identifier, and the to-be-simulated circuit is simulated according to the power supply voltage file.

Herein, after the power supply voltage file is generated, the simulation platform may supply power to each target power supply node according to the power supply voltage corresponding to each target power supply node in the power supply voltage file, and then perform simulation testing on the to-be-simulated circuit.

Figure 3:
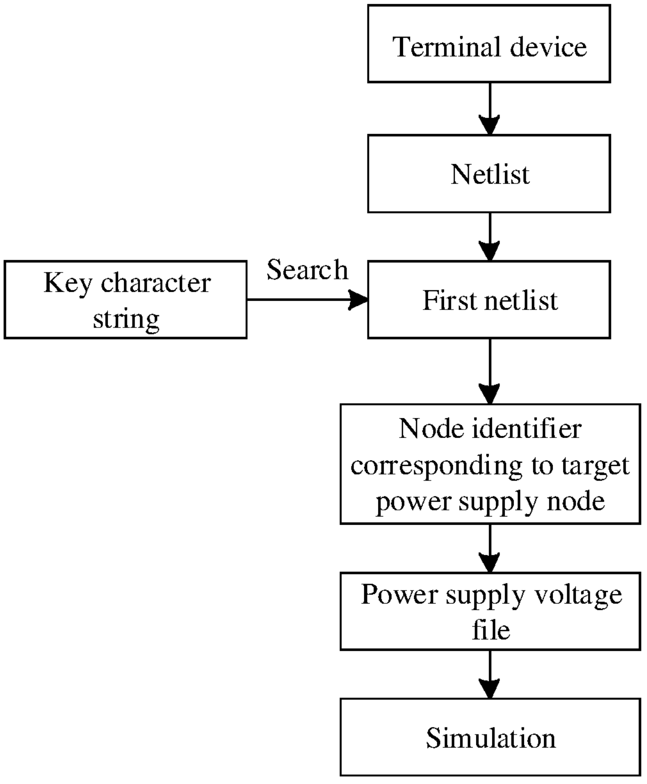
FIG. 3 is a third schematic flowchart showing operations of a circuit simulation method according to an embodiment of the present disclosure.

In order to better understand the embodiments of the present disclosure, referring to FIG. 3, FIG. 3 is a third schematic flowchart showing operations of a circuit simulation method according to an embodiment of the present disclosure. In some embodiments of the present disclosure, the circuit simulation method includes the following operations.

Firstly, the design database of the to-be-simulated circuit is acquired.

Secondly, the netlist corresponding to the to-be-simulated circuit is generated based on the design database.

Thirdly, the node identifier corresponding to each power supply node in the to-be-simulated circuit is acquired from the netlist, and the first netlist is generated according to the node identifier corresponding to each power supply node.

Fourthly, the node identifier corresponding to the target power supply node is searched out from the first netlist based on the received key character string.

Fifthly, the power supply voltage file corresponding to the target power supply node is generated according to the searched-out node identifier.

Sixthly, the to-be-simulated circuit is simulated according to the power supply voltage file.

According to the circuit simulation method provided by the embodiments of the present disclosure, after the netlist is generated based on the design database of the to-be-simulated circuit, the first netlist is generated based on the netlist, the node identifier corresponding to the target power supply node is searched out from the first netlist of the to-be-simulated circuit through the key character string corresponding to the target power supply node, then the power supply voltage file corresponding to the target power supply node may be automatically generated based on the searched-out node identifier, and then the to-be-simulated circuit is simulated according to the power supply voltage file. In this way, compared with a way of manually checking the target power supply node and manually editing the power supply voltage file, the circuit simulation efficiency may be effectively improved, and the accuracy of the simulation result is ensured.

Based on the contents described in the embodiments, the embodiments of the present disclosure further provide a circuit simulation apparatus, which is applied to a to-be-simulated circuit. The to-be-simulated circuit includes multiple power supply nodes.

Figure 4:
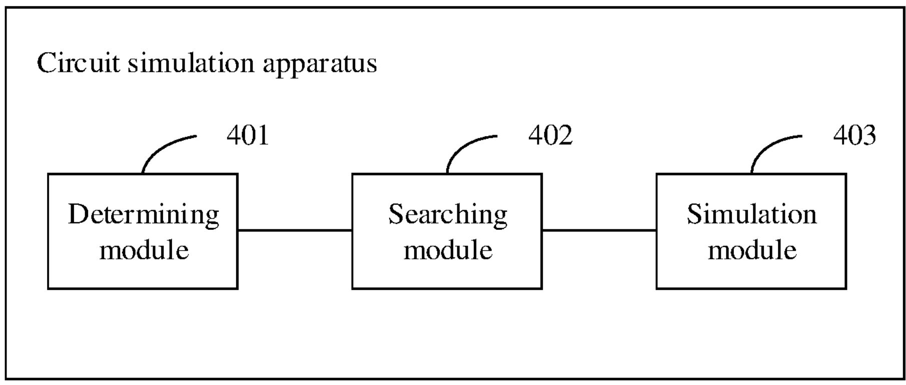
FIG. 4 is a schematic diagram showing program modules of a circuit simulation apparatus according to an embodiment of the present disclosure.

Referring to FIG. 4, FIG. 4 is a schematic diagram showing program modules of a circuit simulation apparatus according to an embodiment of the present disclosure. The circuit simulation apparatus includes: a determining module 401, a searching module 402 and a simulation module 403.

The determining module 401 is configured to determine a key character string corresponding to at least one target power supply node.

The searching module 402 is configured to search out a node identifier corresponding to the at least one target power supply node from a first netlist corresponding to the to-be-simulated circuit according to the key character string. The node identifier consists of the key string and at least one other character.

The simulation module 403 is configured to generate a power supply voltage file corresponding to the at least one target power supply node according to the searched-out node identifier, and simulate the to-be-simulated circuit according to the power supply voltage file.

In a feasible implementation, the searching module 502 is configured to:

- search out a node identifier including the key character string in the first netlist corresponding to the to-be-simulated circuit, different power supply nodes in the first netlist corresponding to different node identifiers; and
- use a searched-out node identifier including the key character string as the node identifier corresponding to the at least one target power supply node.

In a feasible implementation, the simulation module 403 is configured to:

- query a power supply voltage of the target power supply node corresponding to each node identifier according to the searched-out node identifier; and
- generate the power supply voltage file according to the power supply voltage of the target power supply node corresponding to each node identifier.

In a feasible implementation, the simulation module 403 is configured to:

- output a power supply voltage data item corresponding to each node identifier on a line-by-line basis according to a preset output format, the power supply voltage data item corresponding to each node identifier including the power supply voltage of the target power supply node corresponding to each node identifier; and
- generate the supply voltage file based on output supply voltage data item of each line.

In a feasible implementation, the apparatus further includes a netlist generating module, configured to:

- generate a netlist corresponding to the to-be-simulated circuit according to a design database of the to-be-simulated circuit;
- acquire, from the netlist, the node identifier corresponding to each power supply node in the to-be-simulated circuit; and
- generate the first netlist according to the node identifier corresponding to each power supply node.

In a feasible implementation, the target power supply node is a power supply node, which is connected with an external power supply through a power switch, in the to-be-simulated circuit.

It is to be noted that, for the specific content executed by the determining module 401, the searching module 402, and the simulation module 403 in the embodiment of the present disclosure, reference may be made to the relevant content in the embodiments shown in FIG. 1 to FIG. 3, which may not be repeated here.

Further, based on the described contents in the above embodiments, the embodiment of the present disclosure further provides an electronic device. The electronic device includes at least one processor and a memory. Herein, the memory stores computer-executable instructions. The at least one processor executes the computer-executable instruction stored in the memory to implement each step in the circuit simulation method described in the above embodiments, which may not be repeated here.

Figure 5:
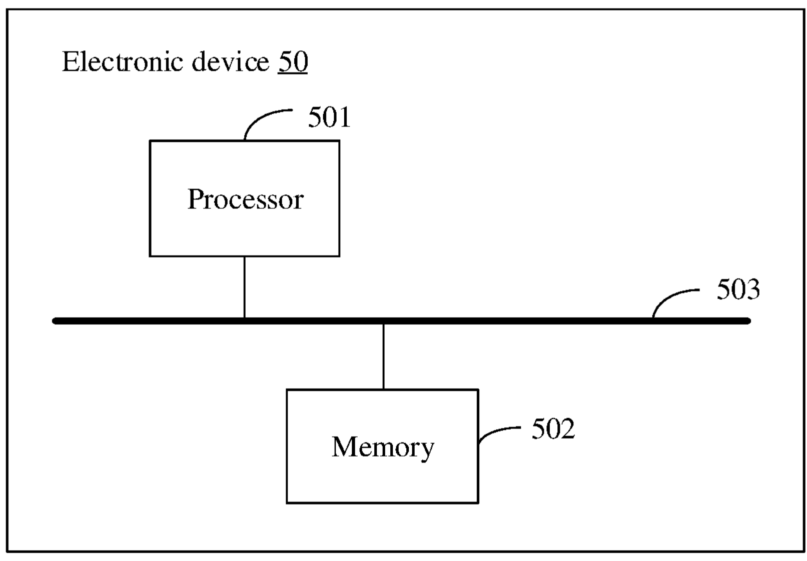
FIG. 5 is a schematic diagram showing a hardware structure of an electronic device according to an embodiment of the present disclosure.

In order to better understand the embodiment of the present disclosure, referring to FIG. 5, FIG. 5 is a schematic diagram showing a hardware structure of an electronic device according to an embodiment of the present disclosure.

As shown in FIG. 5, the electronic device 50 of the embodiment includes the processor 501 and the memory 502.

The memory 502 is configured to store computer-executable instructions.

The processor 501 is configured to execute the computer-executable instruction stored in the memory to implement each step in the circuit simulation method described in the above embodiments. For details, reference is made to the description in the above embodiments, which may not be repeated here.

Optionally, the memory 502 may be independent, or may be integrated with the processor 501.

When the memory 502 is arranged independently, the device further includes a bus 503 configured to connect the memory 502 with the processor 501.

Further, based on the described content in the above embodiments, the embodiments of the present disclosure further provide a computer-readable storage medium. The computer-readable storage medium stores computer-executable instructions. When the computer-executable instructions are executed by a processor, each step in the circuit simulation method described in the above embodiments may be implemented, which may not be repeated here.

In several embodiments provided by the present disclosure, it is to be understood that the disclosed device and method may be implemented in other ways. For example, the device embodiment described above is only schematic, and for example, division of the modules is only logic function division, and other division manners may be adopted during practical implementation. For example, multiple modules may be combined or integrated into another system, or some properties may be neglected or not executed. In addition, the displayed or discussed mutual coupling or direct coupling or communication connection may be indirect coupling or communication connection through some interfaces, apparatuses or modules, and may be in electrical, mechanical or other forms.

The modules described as separate components may or may not be physically separated. The components displayed as modules may or may not be physical units, that is, the components may be located in one place, or may be distributed on the plurality of network units. Part or all of the modules may be selected according to actual requirements to achieve the purposes of the solutions of the embodiment.

In addition, each function module in each embodiment of the present disclosure may be integrated into a processing module, or each module may also physically exist independently, or two or more than two modules may also be integrated into a unit. The module integrated unit may be implemented in a hardware form, or may be implemented in form of hardware and software function unit.

It is to be noted at last: the above various embodiments are only used to illustrate the technical solutions of the present disclosure and not used to limit the same. Although the present disclosure has been described in detail with reference to the foregoing embodiments, for those of ordinary skill in the art, they can still modify the technical solutions described in the foregoing embodiments, or equivalently replace part or all of the technical features; all these modifications and replacements shall not cause the essence of the corresponding technical solutions to depart from the scope of the technical solutions of the embodiments of the present disclosure.

What is claimed is:

1. A circuit simulation method, applied to a to-be-simulated circuit comprising multiple power supply nodes, the method comprising:

generating a netlist corresponding to the to-be-simulated circuit according to a design database of the to-be-simulated circuit;

acquiring, from the netlist, a node identifier corresponding to each power supply node in the to-be-simulated circuit;

generating a first netlist according to the node identifier corresponding to each power supply node:

determining a key character string corresponding to at least one target power supply node;

searching out a node identifier corresponding to the at least one target power supply node from the first netlist corresponding to the to-be-simulated circuit according to the key character string, the node identifier consisting of the key character string and at least one other character; and generating a power supply voltage file corresponding to the at least one target power supply node according to the searched-out node identifier, and simulating the to-be-simulated circuit according to the power supply voltage file.

2. The method of claim 1, wherein searching out the node identifier corresponding to the at least one target power supply node from the first netlist corresponding to the to-be-simulated circuit according to the key character string comprises:

searching out a node identifier comprising the key character string from the first netlist corresponding to the to-be-simulated circuit, wherein different power supply nodes in the first netlist correspond to different node identifiers; and using a searched-out node identifier comprising the key character string as the node identifier corresponding to the at least one target power supply node.

3. The method of claim 1, wherein generating the power supply voltage file corresponding to the at least one target power supply node according to the searched-out node identifier comprises:

querying a power supply voltage of the target power supply node corresponding to each node identifier according to the searched-out node identifier; and generating the power supply voltage file according to the power supply voltage of the target power supply node corresponding to each node identifier.

4. The method of claim 3, wherein generating the power supply voltage file according to the power supply voltage of the target power supply node corresponding to each node identifier comprises:

outputting a power supply voltage data item corresponding to each node identifier on a line-by-line basis according to a preset output format, wherein the power supply voltage data item corresponding to each node identifier comprises the power supply voltage of the target power supply node corresponding to each node identifier; and generating the power supply voltage file based on output supply voltage data item of each line.

5. The method of claim 1, wherein the target power supply node is a power supply node, which is connected with an external power supply through a power switch, in the to-be-simulated circuit.

6. A circuit simulation apparatus, applied to a to-be-simulated circuit comprising multiple power supply nodes, the apparatus comprising:

a memory storing processor-executable instructions; and a processor configured to execute the stored processor-executable instructions to perform operations of:

generating a netlist corresponding to the to-be-simulated circuit according to a design database of the to-be-simulated circuit;

acquiring, from the netlist, a node identifier corresponding to each power supply node in the to-be-simulated circuit;

generating a first netlist according to the node identifier corresponding to each power supply node;

determining a key character string corresponding to at least one target power supply node;

searching out a node identifier corresponding to the at least one target power supply node from the first netlist corresponding to the to-be-simulated circuit according to the key character string, the node identifier consisting of the key character string and at least one other character; and generating a power supply voltage file corresponding to the at least one target power supply node according to the searched-out node identifier, and simulate the to-be-simulated circuit according to the power supply voltage file.

7. The circuit simulation apparatus of claim 6, wherein searching out the node identifier corresponding to the at least one target power supply node from the first netlist corresponding to the to-be-simulated circuit according to the key character string comprises:

searching out a node identifier comprising the key character string from the first netlist corresponding to the to-be-simulated circuit, wherein different power supply nodes in the first netlist correspond to different node identifiers; and using the node identifier comprising the key character string as the node identifier corresponding to the at least one target power supply node.

8. The circuit simulation apparatus of claim 6, wherein generating the power supply voltage file corresponding to the at least one target power supply node according to the searched-out node identifier comprises:

querying a power supply voltage of the target power supply node corresponding to each node identifier according to the searched-out node identifier; and generating the power supply voltage file according to the power supply voltage of the target power supply node corresponding to each node identifier.

9. The circuit simulation apparatus of claim 8, wherein generating the power supply voltage file according to the power supply voltage of the target power supply node corresponding to each node identifier comprises:

outputting a power supply voltage data item corresponding to each node identifier on a line-by-line basis according to a preset output format, wherein the power supply voltage data item corresponding to each node identifier comprises the power supply voltage of the target power supply node corresponding to each node identifier; and generating the power supply voltage file based on output supply voltage data item of each line.

10. The circuit simulation apparatus of claim 6, wherein the target power supply node is a power supply node, which is connected with an external power supply through a power switch, in the to-be-simulated circuit.

11. A non-transitory computer-readable storage medium having stored thereon computer-executable instructions that, when executed by a processor, cause the processor to implement operations of:

generating a netlist corresponding to the to-be-simulated circuit according to a design database of the to-be-simulated circuit;

acquiring, from the netlist, a node identifier corresponding to each power supply node in the to-be-simulated circuit;

generating a first netlist according to the node identifier corresponding to each power supply node;

determining a key character string corresponding to at least one target power supply node;

searching out a node identifier corresponding to the at least one target power supply node from the first netlist corresponding to the to-be-simulated circuit according to the key character string, the node identifier consisting of the key character string and at least one other character; and generating a power supply voltage file corresponding to the at least one target power supply node according to the searched-out node identifier, and simulate the to-be-simulated circuit according to the power supply voltage file.

12. The non-transitory computer-readable storage medium of claim 11, wherein searching out the node identifier corresponding to the at least one target power supply node from the first netlist corresponding to the to-be-simulated circuit according to the key character string comprises:

searching out a node identifier comprising the key character string from the first netlist corresponding to the to-be-simulated circuit, wherein different power supply nodes in the first netlist correspond to different node identifiers; and using a searched-out node identifier including the key character string as the node identifier corresponding to the at least one target power supply node.

13. The non-transitory computer-readable storage medium of claim 11, wherein generating the power supply voltage file corresponding to the at least one target power supply node according to the searched-out node identifier comprises:

querying a power supply voltage of the target power supply node corresponding to each node identifier according to the searched-out node identifier; and generating the power supply voltage file according to the power supply voltage of the target power supply node corresponding to each node identifier.

14. The non-transitory computer-readable storage medium of claim 13, wherein generating the power supply voltage file according to the power supply voltage of the target power supply node corresponding to each node identifier comprises:

outputting a power supply voltage data item corresponding to each node identifier on a line-by-line basis according to a preset output format, wherein the power supply voltage data item corresponding to each node identifier comprises the power supply voltage of the target power supply node corresponding to each node identifier; and generating the power supply voltage file based on output supply voltage data item of each line.

15. The non-transitory computer-readable storage medium of claim 11, wherein the target power supply node is a power supply node, which is connected with an external power supply through a power switch, in the to-be-simulated circuit.

* * * * *